J. W. TYGARD.
INTERNAL COMBUSTION ENGINE.
APPLICATION FILED JAN. 28, 1903.

1,123,039.

Patented Dec. 29, 1914.
4 SHEETS—SHEET 1.

Witnesses:

Inventor:
James W. Tygard
By Southgate & Southgate
Attorneys

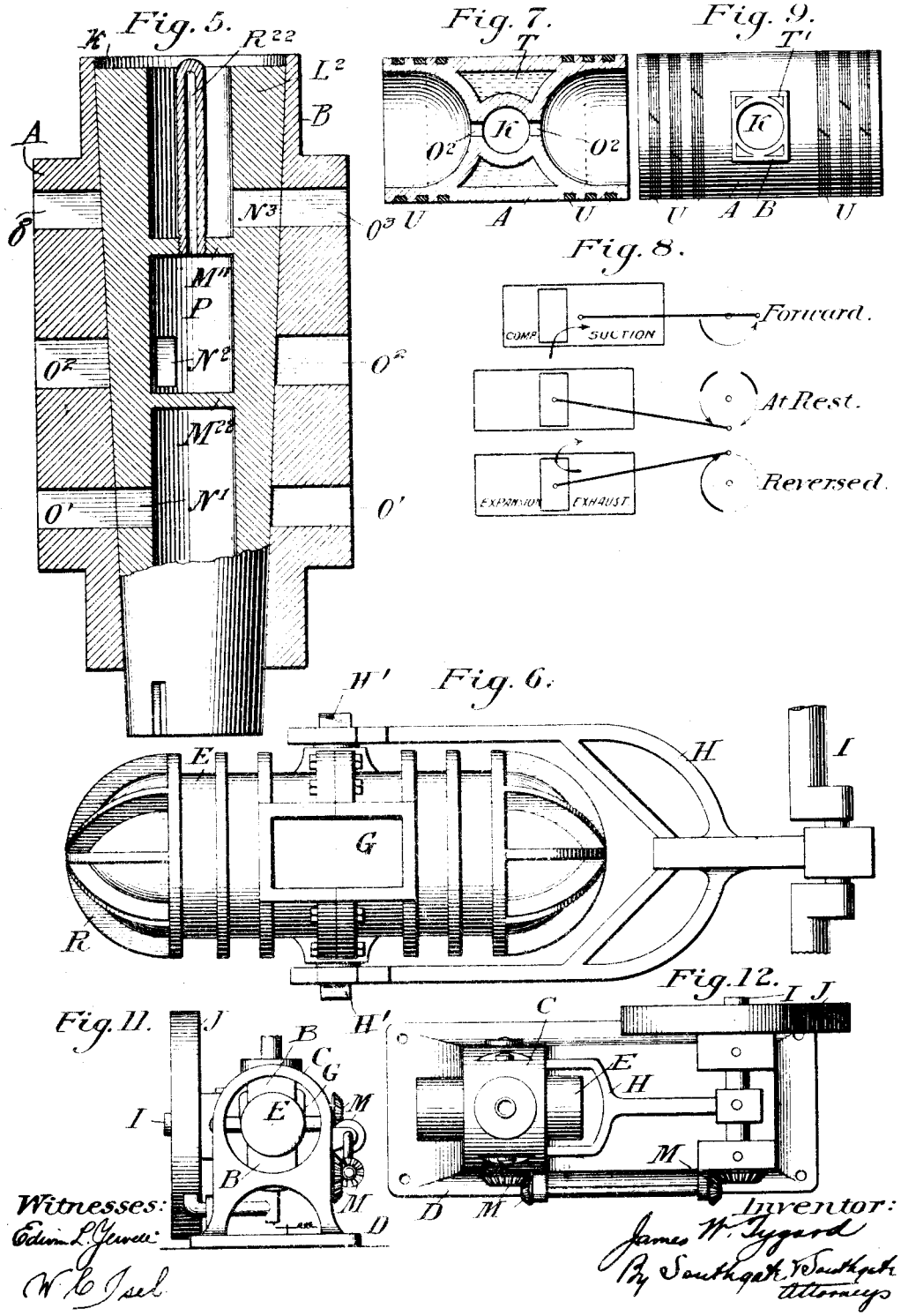
J. W. TYGARD.
INTERNAL COMBUSTION ENGINE.
APPLICATION FILED JAN. 23, 1903.
1,123,039.
Patented Dec. 29, 1914.
4 SHEETS—SHEET 2.

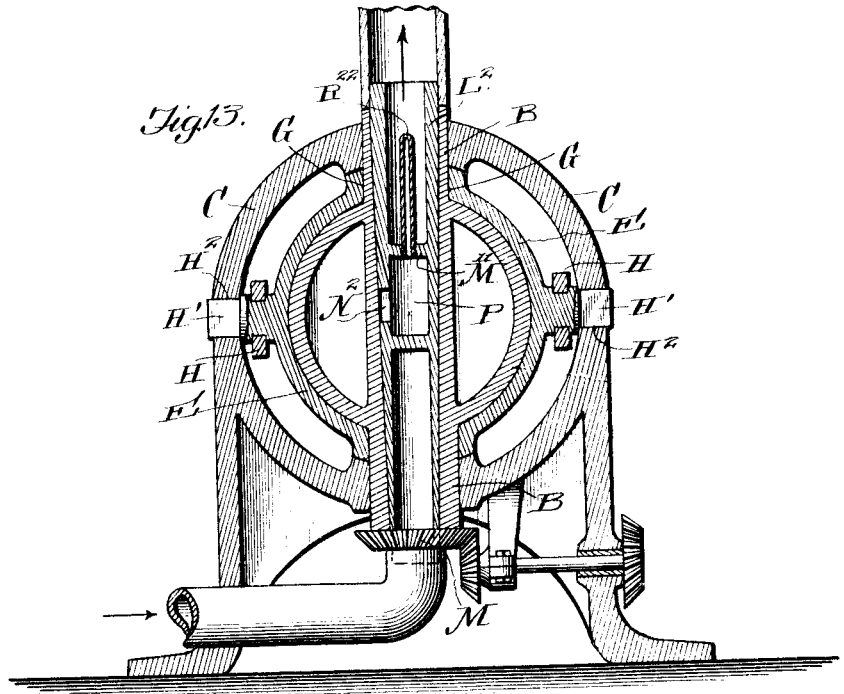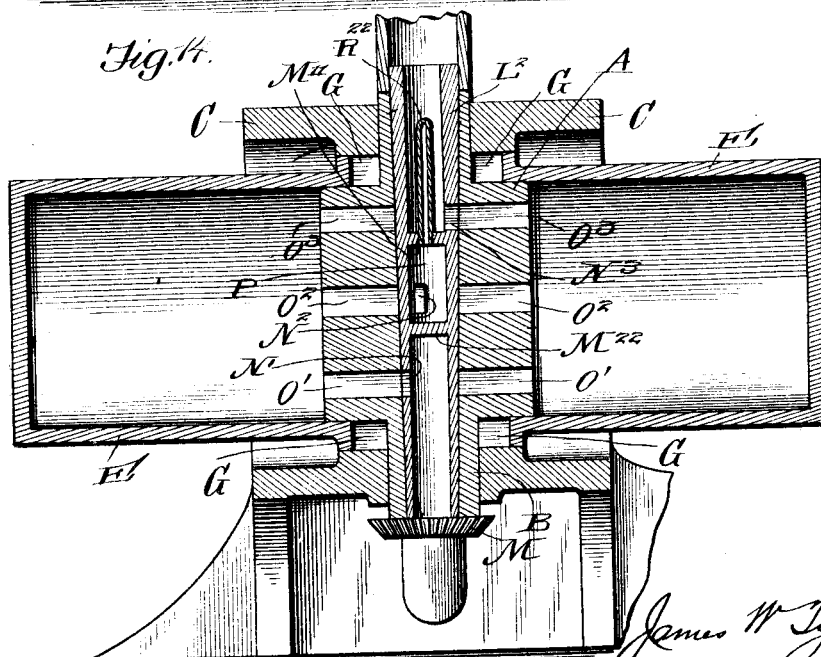

J. W. TYGARD.
INTERNAL COMBUSTION ENGINE.
APPLICATION FILED JAN. 23, 1905.

1,123,039.

Patented Dec. 29, 1914.

UNITED STATES PATENT OFFICE.

JAMES WALLACE TYGARD, OF NEW YORK, N. Y., ASSIGNOR TO THE TYGARD ENGINE, A CORPORATION OF NEW JERSEY.

INTERNAL-COMBUSTION ENGINE.

1,123,039. Specification of Letters Patent. Patented Dec. 29, 1914.

Application filed January 28, 1903. Serial No. 140,903.

*To all whom it may concern:*

Be it known that I, JAMES WALLACE TYGARD, a citizen of the United States of America, residing in New York, in the county of New York and State of New York, have invented a new and useful Internal-Combustion Engine, of which the following is a specification, reference being had to the accompanying drawings, in which—

Figure 1:
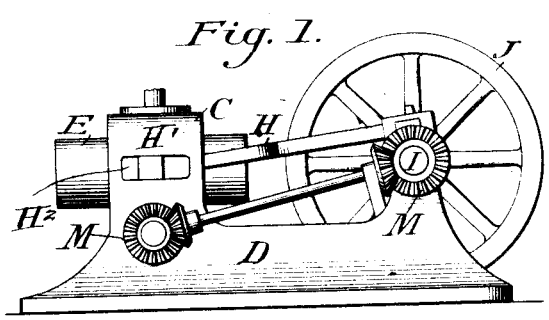
Figure 2:
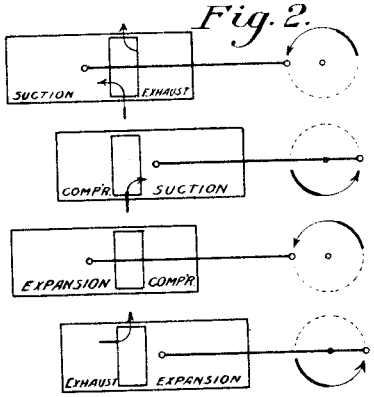
Figure 3:
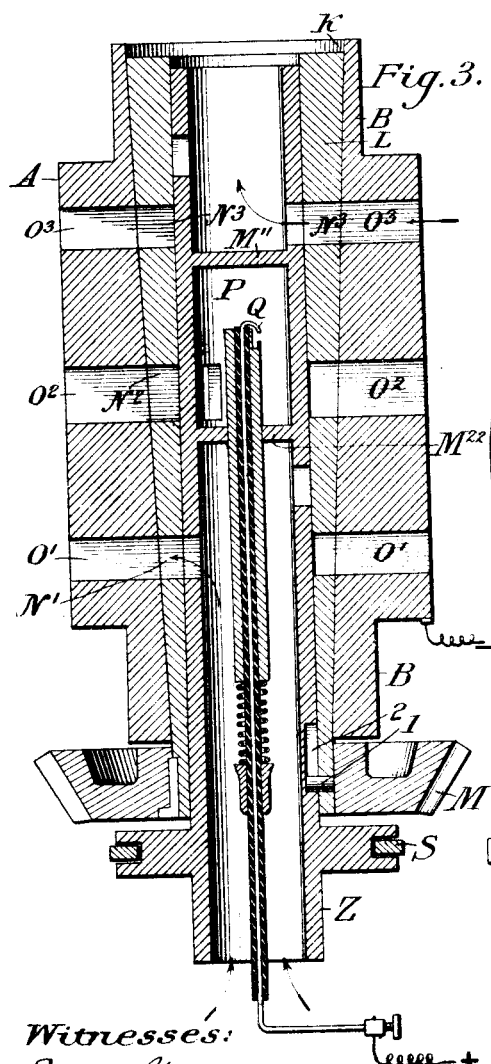
Figure 4:
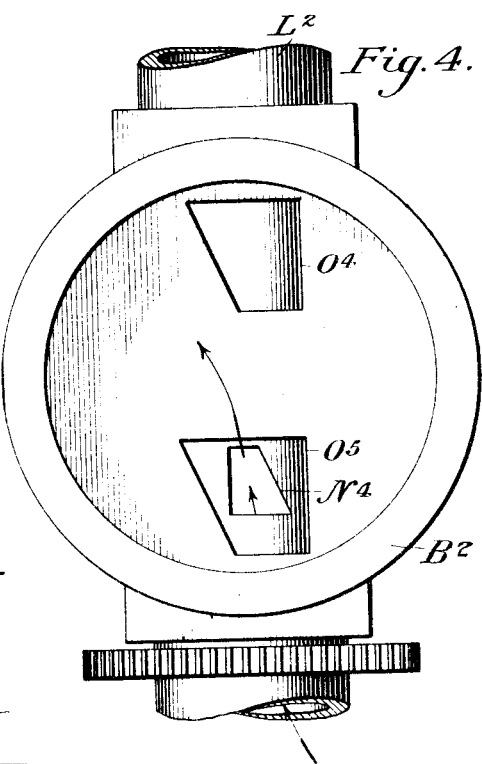
Figure 10:
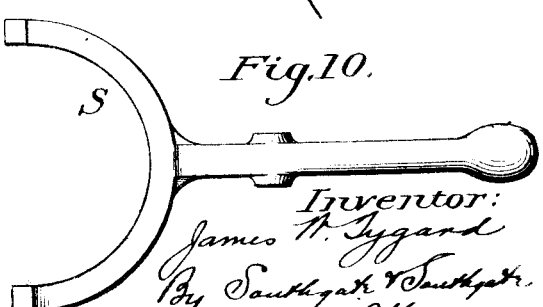
Figure 15:
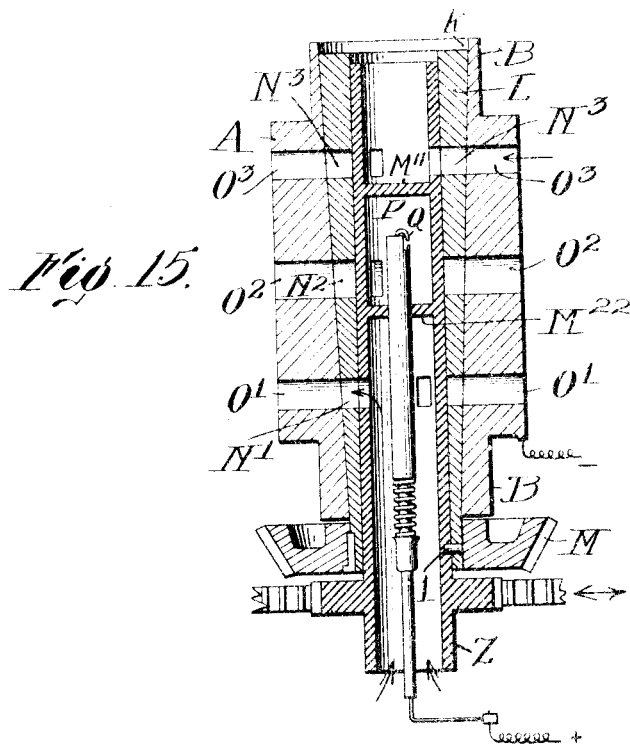
Figure 16:
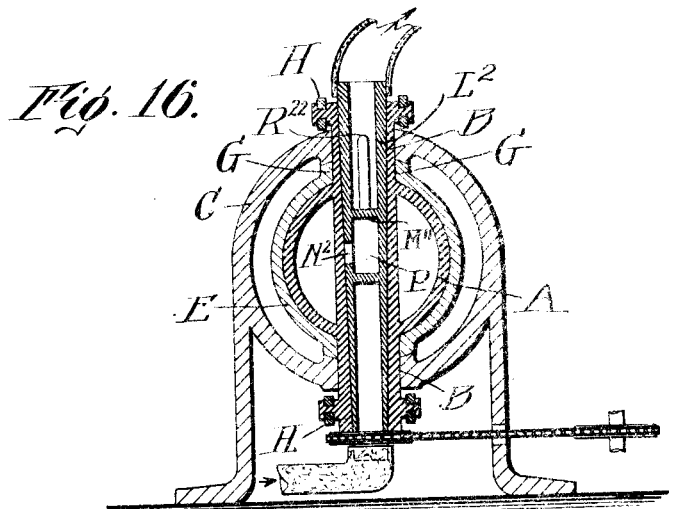

Figure 1 is a side elevation of an engine provided with a preferred embodiment of my improvements; Fig. 2 is a diagram of the cyclic action during two revolutions of the motor shaft; Fig. 3 is a detail longitudinal sectional view taken through the center of the piston and the contained valve; Fig. 4 is a side view of the same somewhat modified; Fig. 5 is a sectional view similar to Fig. 3 showing another form of the valve structure; Fig. 6 is a plan of a flanged cylinder and connected pitman-yoke, especially adapted for use on motor vehicles; Fig. 7 is a central longitudinal section of a form of piston especially adapted for use in motor vehicles; Fig. 8 is a diagram of the cyclic action occurring when the engine is being reversed; Fig. 9 is a side view of the piston shown in Fig. 7; Fig. 10 is a detail of the reversing lever; Fig. 11 is an end view of the engine, reduced; Fig. 12 is a plan of the same; Fig. 13 is a vertical transverse sectional view taken at the center of the cylinder in Fig. 12 on an enlarged scale and slightly modified; Fig. 14 is a central longitudinal sectional view of the same; Fig. 15 is a view similar to Fig. 3 showing a modification; and Fig. 16 is a view similar to Fig. 15 showing another modification.

This invention has for its objects greatly to simplify the number and weight of the parts, and to allow double the number of impulses or work-strokes to be obtained during the same number of shaft revolutions, as compared with what it was possible to secure in an engine of similar weight with the single acting piston and multiple valves in common use with the Otto-cycle engine; to render single cylinder engines reversible; to secure increased steadiness of running by a greater frequency of impulse strokes, and to lessen vibration, by increased frequency of impulse strokes which permits weaker impulses to be used, consequently with less strain upon the working parts.

The invention has other objects in view, which will be set forth hereinafter.

Referring to the drawings by letters, A designates a double acting piston supported rigidly within a cylindrical frame C mounted upon a bed-plate D. This piston is secured in place by a pair of lugs B which are formed integral with the piston and project from its sides at diametrically opposite points and enter openings in the frame C. Inclosing this piston and working back and forth upon it and upon suitable slides in the engine frame is a cylinder E closed at both ends and provided with longitudinal slots G through which pass the stationary lugs B connecting the piston and the engine frame. This cylinder is shown in Fig. 6 as formed of two parts bolted together. A suitable yoke-pitman H connects the moving cylinder with the crank-shaft I carrying the fly-wheel J of the cylinder. This yoke-pitman is pivotally connected to lugs H' projecting in opposite directions from the cylinder and whose outer ends work in slots H² formed in the ends of the frame C. A tubular valve L² (Fig. 5) preferably conical in shape, is mounted to rotate in a transverse similarly shaped passage K extending through the supporting lugs B and the piston. This valve is adapted to be rotated by suitable gearing M driven from the shaft of the motor, at a speed of one-half the number of revolutions made by said shaft. This hollow valve is provided with transverse partitions $M^{11}$ and $M^{22}$, and is open at each end. Three openings or ports N', N² and N³, through the side of this valve communicate alternately and successively as the valve is revolved with suitable corresponding ports O', O² and O³ connecting the valve seat K with the respective faces of the piston.

In Fig. 4 the endwise moving rotary cylindrical valve L² is mounted in a cylinder having a flange B² for fastening it in place on the engine, and provided with ports O⁴ and O⁵ within the flange, one of which communicates with the port N⁴ in the valve. The arrows show the path of the gases when the port N⁴ and receiving port O⁶ register. The exhaust port in the valve communicating with the exhaust port O⁴ does not show in the drawing, because it is at the opposite side of the cylinder at this time.

The interior construction of the valve L² is not shown, but is like that of the valve L² in Fig. 5, having a partition to separate the live gases from the exhaust. This port construction is also applicable to steam engine governors, and the right is reserved to file a divisional application on this form more especially for that purpose.

A suitable combustible fluid or vapor properly mingled with air to support combustion, is introduced into the intake or charge inlet end as shown, i. e., the lower end, and by means of ports N' and O' is successively and alternately introduced into the spaces between the piston faces and cylinder ends when the engine is making its suction stroke. The middle of the valve contains a suitable cavity P, formed by partitions M¹¹ and M²². A second port N² registering with the corresponding ports O² in the piston faces, allows the combustible mixture to flow into this cavity P at the end of the compression stroke of the engine, thereby igniting the charge. A third port N³ in the valve communicates with the outlet end of the valve beyond the partion M¹¹ and by suitable corresponding ports O³ and O³ in the piston faces opens communication with the atmosphere during the exhaust stroke. All ports remain closed during the working stroke.

It will be seen that the action in each end of the cylinder is the same as in the Otto-cycle internal combustion engine of the usual type. The inlet ports in the revolving valve successively deliver in both ends of the cylinder a combustible charge, which, at the proper time, is ignited first in one and then in the opposite end of the cylinder, as the port N² in the valve comes in communication with the compressed charged in the end of the cylinder. This allows part of said compressed charge to flow into the igniting chamber P and become ignited, to be afterward expelled through the exhaust passage by the revolution of the valve. Any suitable igniter may be used, as is evident. In Fig. 5 I show a hot tube igniter R²², and in Fig. 3 a jump-spark device Q extending up through the partition M²².

In small engines such as are commonly used to propel motor vehicles, in which it is desirable to reverse the motor without the use of cog or friction gears, while the motor is running, I may construct a valve as shown in Fig. 3. In this figure is shown an inner multiple ported cylindrical sleeve or reversing valve Z, slidably mounted in the bore of the valve L which is ported like the valve L² and prevented from rotating therein by a suitable pin or key 1 engaging in a slot 2. This sleeve or tube Z may be adjusted readily while the engine is moving by means of the reversing handle S. In this case the sleeve contains the partitions M¹¹ and M²² inclosing a chamber P. The ports in this sleeve are so placed as to register with the valve ports when the engine is moving in either direction. Endwise movement of the sleeve in one direction brings the forward set of ports in register with those in the valve, being timed to give forward crank movement. Reverse movement endwise of the sleeve, when the engine is nearing the end of a compression stroke, as shown in the cycle diagram in Fig. 8, closes all ports thereby imprisoning the combustible mixture which occupies both ends of the cylinder, one end under high pressure and the opposite end being filled with the mixture at atmospheric pressure. As the imprisoned compressed charge is not yet fired, its pressure compresses the charge filling the other end of the cylinder as the former moves to a point of equalized pressure and rest shown in the second diagram in Fig. 8, thus stopping the engine off the crank center. Further endwise movement of the sleeve Z causes the other set of ports to register with those in the valve. The electric spark in the cavity P occurs at this time, thereby igniting the partially compressed charge in the reverse end of the cylinder, reversing its movement, and re-compressing the charge in the opposite end until at the end of the stroke the next ignition is effected. The accelerated impulse immediately follows the half stroke initial one, and the cyclic action of suction, compression, expansion and exhaust are then resumed, with the engine shaft moving in an opposite or reverse direction. It is obvious that the reversing sleeve may be so ported that its partial rotation instead of reciprocation within the bore of the valve will at one point close all ports and at the other points bring either the forward or backward set of ports into register with those in the valve, if desired. This is shown in Fig. 15.

Small sizes of engines may be kept cool by radiation from suitable flanges R upon the surface of the cylinder, as shown in Fig. 6, the movement assisting the cooling process. The larger sizes of engines may be constructed to permit circulation of the water in a jacket placed around the outside of the cylinder in the usual manner, suitable flexible connections being employed to convey the cooling water to and from the moving cylinder. The preferable construction of the piston in such cases is shown in Figs. 7 and 9, the cooling water spaces around the valve being shown at T and the openings for introducing the water through the lug B being shown at T'.

My invention may also be applied to engines built with stationary cylinders and moving pistons, in which case the yoke pitman H may be connected direct to the lug B in which the valve may be rotated by suitable sprockets and chain belts or swivel or universal jointed shafts to permit movement of the piston. The exhaust will also be conducted away through suitable flexible couplings. This is shown in Fig. 16. The ignition device may be the usual jump-spark with stationary electrodes, the break being made by suitable mechanism outside the cylinder, the variable point rotary wipe-sparker, the incandescent tube type of igniter, or any other suitable device.

Any suitable type of packing ring as shown at U, Figs. 7 and 9, may be used to keep the piston tight. The valve L is preferably cone-shape, as shown, this shape permitting easy adjustment to take up the wear and also ready removal for repair.

It will be apparent to those skilled in the art that various mechanical embodiments of the invention are possible and I, therefore, do not wish to be limited to the exact arrangement and construction shown.

What I claim and desire to secure by Letters-Patent is:—

1. In an internal combustion engine, the combination of a piston, a movable cylinder inclosing the piston, an admission port extending through the wall of the piston, and a movable device entirely inclosed in the piston, extending transversely through the cylinder and having a port adapted to register with said admission port for controlling said admission port.

2. In a double acting internal combustion engine, the combination of a piston containing supply and exhaust ports on both sides thereof and igniting devices, a movable cylinder embracing the piston, a valve rotatable on an axis transverse to the axis of the cylinder for controlling said ports, an engine shaft, and means connecting said shaft with said movable cylinder, whereby said shaft is operated.

3. In an internal combustion engine, the combination of a frame, a stationary two faced piston, provided with an internal passage and ports connecting its passage with its opposite faces, means within the piston for controlling the supply and exhaust through these ports, this means consisting of a tubular valve extending through the piston, a double ended cylinder embracing the piston and movable with respect thereto, an engine shaft connected up to the movable cylinder, and means for operating the tubular valve from the engine shaft, and igniting means.

4. In an internal combustion engine, the combination of a frame, a stationary two faced piston mounted therein and having admission and exhaust ports in its faces, a rotatable tubular valve extending through the piston and provided with ports registering with the ports in the piston faces and adapted to conduct the fuel to the admission ports and to conduct the products of combustion away from the exhaust ports, an igniter in this valve, and a double ended cylinder inclosing the piston, an engine shaft connected up to this cylinder, and means for automatically rotating the valve.

5. In an internal combustion engine, the combination of a stationary two-faced piston, a movable cylinder inclosing and slidable on the piston, an engine shaft connected up to said movable cylinder, supply and exhaust ports and igniting devices inclosed within the piston, said supply and exhaust ports extending through the end walls thereof, and means for automatically controlling the supply and exhaust ports from said engine shaft.

6. In an internal combustion engine, the combination of a frame, a piston mounted stationarily therein and provided with ports leading to its opposite faces, a double ended cylinder inclosing the piston and movable thereon, an engine shaft connected up to this cylinder, a tubular rotatable valve extending through the piston and provided with ports adapted to connect with the ports leading to the piston faces, this valve being partitioned off to form inlet, outlet, and igniting chambers, an igniter for the igniting chamber, and means for rotating said valve automatically.

7. In an internal combustion engine, the combination of a stationary double faced piston, a slidable cylinder inclosing the piston, an engine shaft connected up to said cylinder, supply and exhaust ports located in the piston, and a movable ported reversing valve inclosed in the piston for automatically controlling the ports.

8. In an internal combustion engine, the combination of a stationary double faced piston, a slidable cylinder inclosing the piston, an engine shaft connected up to said cylinder, supply and exhaust ports located in the piston, and a reversing valve slidably mounted in the piston for automatically controlling these ports.

9. In an internal combustion engine, the combination of a stationary double faced piston, a slidable cylinder inclosing the piston, an engine shaft connected up to said cylinder, supply and exhaust ports located in the piston, means for automatically controlling these ports, and a slidable multi-ported tubular reversing valve also inclosed in the piston and having ports adapted to register with said supply and exhaust ports.

10. In an internal combustion engine, the combination of a frame, a stationary ported piston, a cylinder slidable on the piston, an engine shaft connected up to this cylinder, a tubular valve extending through the piston and having ports adapted to register with ports in the piston, a tubular reversing valve inclosed in said valve and provided with ports adapted to register with the ports in the first mentioned valve, means for automatically operating the first mentioned valve and means for manually operating the reversing valve, and an igniter inclosing within said valve.

11. In an internal combustion engine, the combination of a frame, a stationary two-faced piston mounted therein and having admission and exhaust ports in its faces, a rotatable tubular conical valve extending through the piston and provided with ports registering with the ports in the piston faces and adapted to conduct the fuel to the admission ports and to conduct the products of combustion away from the exhaust ports, an igniter in this valve, and a double ended cylinder inclosing the piston, an engine shaft connected up to this cylinder, and means for automatically rotating the valve.

12. In an internal combustion engine, the combination of a stationary two-faced piston, a movable cylinder inclosing and slidable on the piston and consisting of two cylindrical sections joined together transversely at the middle of the cylinder, an engine shaft connected up to said movable cylinder, supply and exhaust ports extending through the walls of the piston and cylinder, and igniting devices inclosed within the piston, and means for automatically controlling these devices and ports.

13. In combination with a frame, a double faced piston provided with radial lugs stationarily mounted therein, a double engine cylinder inclosing and slidable on the piston, an engine shaft connected up to said cylinder, and a tubular supply and exhaust valve extending through said lugs and the piston, and an igniter.

14. In an internal combustion engine, the combination of a frame, a stationary piston secured thereto, a cylinder inclosing and coöperating with said piston, and a tubular supply and exhaust valve extending transversely through said piston, and means for automatically operating the same.

15. In an internal combustion engine, the combination of a frame, a stationary piston secured thereto, a cylinder inclosing and coöperating with said piston, a tubular supply and exhaust valve extending transversely through said piston, means for automatically operating the same, and an igniter inclosed within the tubular valve.

16. In an internal combustion engine, the combination of a frame, a piston, a cylinder inclosing and coöperating with said piston, a tubular supply and exhaust valve extending transversely through said piston, means for operating said valve, and an igniter inclosed within said valve.

17. In an internal combustion engine, the combination of a piston, a slidable cylinder inclosing the piston, supply and exhaust ports located within the piston, means for controlling said ports, and a slidable, multiported, tubular reversing valve inclosed in the piston.

In testimony whereof, I have signed my name to this specification in the presence of two subscribing witnesses.

JAMES WALLACE TYGARD. [L. S.]

Witnesses:
JOHN JOHNSTON,
E. A. TYGARD.